US012424666B2

(12) United States Patent
Zhao

(10) Patent No.: US 12,424,666 B2
(45) Date of Patent: Sep. 23, 2025

(54) ELECTROCHEMICAL APPARATUS AND ELECTRONIC APPARATUS

(71) Applicants: Ningde Amperex Technology Limited, Ningde (CN); Dongguan Amperex Technology Limited, Dongguan (CN)

(72) Inventor: Shimeng Zhao, Ningde (CN)

(73) Assignees: NINGDE AMPEREX TECHNOLOGY LIMITED, Ningde (CN); DONGGUAN AMPEREX TECHNOLOGY LIMITED, Dongguan (CN)

( * ) Notice: Subject to any disclaimer, the term of this patent is extended or adjusted under 35 U.S.C. 154(b) by 645 days.

(21) Appl. No.: 17/709,193

(22) Filed: Mar. 30, 2022

(65) Prior Publication Data
US 2022/0320595 A1     Oct. 6, 2022

Related U.S. Application Data

(63) Continuation of application No. PCT/CN2021/084681, filed on Mar. 31, 2021.

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/121* (2021.01); *H01M 50/124* (2021.01); *H01M 50/242* (2021.01)

(58) Field of Classification Search
CPC .......... H01M 10/0431; H01M 10/052; H01M 10/0525; H01M 10/0587; H01M 2220/30;
(Continued)

(56) References Cited

U.S. PATENT DOCUMENTS

2012/0270042 A1    10/2012   Hanai et al.
2018/0219246 A1*    8/2018   Park .................... H01M 10/045
(Continued)

FOREIGN PATENT DOCUMENTS

CN     101894966 A     11/2010
CN     203690420 U      7/2014
(Continued)

OTHER PUBLICATIONS

ISR for International Application PCTCN2021084681 mailed Dec. 30, 2021.
(Continued)

*Primary Examiner* — Victoria H Lynch
(74) *Attorney, Agent, or Firm* — Maier & Maier, PLLC

(57) ABSTRACT

An electrochemical apparatus includes a case and a wound electrode assembly disposed inside the case. The electrode assembly includes a first electrode plate, a second electrode plate, a first separator or a second separator provided therebetween. A first adhesive layer is provided on at least one of a surface of the first separator facing away from a center of the electrode assembly or a surface of the second separator facing away from a center of the electrode assembly. At least one of the first separator or the second separator extends out from a terminating end of the electrode assembly and is bonded to the case through the first adhesive layer. A bonding area between the first adhesive layer and the case is greater than or equal to 10% of a contact area between the case and the electrode assembly.

19 Claims, 8 Drawing Sheets

(51) Int. Cl.
  *H01M 50/121* (2021.01)
  *H01M 50/124* (2021.01)
  *H01M 50/242* (2021.01)

(58) Field of Classification Search
  CPC ............ H01M 50/103; H01M 50/107; H01M 50/121; H01M 50/124; H01M 50/186; H01M 50/193; H01M 50/198; H01M 50/242; H01M 50/414; H01M 50/449; Y02E 60/10; Y02P 70/50
  See application file for complete search history.

(56) References Cited

U.S. PATENT DOCUMENTS

| | | | |
|---|---|---|---|
| 2020/0227759 A1 | 7/2020 | Jiang | |
| 2021/0015687 A1* | 1/2021 | Stiehl | A61F 13/535 |
| 2022/0059909 A1* | 2/2022 | Lee | H01M 10/0431 |
| 2023/0079279 A1* | 3/2023 | Taguchi | H01M 50/461 |
| | | | 429/144 |

FOREIGN PATENT DOCUMENTS

| | | |
|---|---|---|
| CN | 206040883 U | 3/2017 |
| CN | 109888161 A | 6/2019 |
| CN | 110379942 A | 10/2019 |
| CN | 211350858 U | 8/2020 |
| WO | 2012046911 A1 | 4/2012 |

OTHER PUBLICATIONS

Written Opinion for International Application PCTCN2021084681 mailed Dec. 30, 2021.
Extended European Search Report for EP application No. 21867913. 2, dated Sep. 30, 2022.

* cited by examiner

ELECTROCHEMICAL APPARATUS AND ELECTRONIC APPARATUS

CROSS REFERENCE TO RELATED APPLICATION

This application is a continuation application of International Patent Application No. PCT/CN2021/084681 filed on Mar. 31, 2021, the disclosure of which is incorporated herein by reference in its entirety.

TECHNICAL FIELD

This application relates to the field of electrochemical technologies, and specifically, to an electrochemical apparatus and an electronic apparatus.

BACKGROUND

With characteristics such as high specific energy, high working voltage, low self-discharge rate, small size, and light weight, lithium-ion batteries (electrochemical apparatuses) have been widely used in fields such as electrical energy storage, portable electronic devices, and electric vehicles. With the expanding application scope of lithium-ion batteries, the market has imposed higher requirements on lithium-ion batteries, requiring lithium-ion batteries to have higher energy density and better safety. During use of lithium-ion batteries, problems such as drops and impacts are inevitable, making it particularly important to improve safety of lithium-ion batteries in the case of abuse such as drops and impacts.

Generally, there is no adhesion between a case and an electrode assembly of a lithium-ion battery, so relative displacement may occur between the electrode assembly and the case in a case that the lithium-ion battery is subject to abuse such as drops or impacts, resulting in safety hazards. Therefore, there is an urgent need for a new technical solution to improve the safety of lithium-ion batteries while reducing impact on their energy density.

SUMMARY

An objective of this application is to provide an electrochemical apparatus and an electronic apparatus, to improve safety performance of electrochemical apparatuses and reduce impact on their energy density. Specific technical solutions are as follows.

It should be noted that in the following content of this application, a lithium-ion battery is used as an example of an electrochemical apparatus to explain this application. However, the electrochemical apparatus of this application is not limited to the lithium-ion battery.

Specific technical solutions are as follows.

A first aspect of this application provides an electrochemical apparatus including a case and a wound electrode assembly disposed inside the case, where the electrode assembly includes a first electrode plate, a second electrode plate having a polarity opposite to that of the first electrode plate, and a first separator or a second separator provided between the first electrode plate and the second electrode plate; and the first electrode plate includes a first current collector. A first adhesive layer is provided on at least one of a surface of the first separator facing away from a center of the electrode assembly or the second separator facing away from a center of the electrode assembly; at least one of the first separator or the second separator extends out from a terminating end of the electrode assembly and is bonded to the case through the first adhesive layer; and a bonding area between the first adhesive layer and the case is greater than or equal to 10% of a contact area between the case and the electrode assembly.

In this application, a first separator or a second separator is provided between the first electrode plate and the second electrode plate, that is, the first separator and the second separator may be alternately arranged between the first electrode plate and the second electrode plate. The arrangement is not particularly limited in this application as long as requirements of this application are met. For example, the electrode assembly may be formed by stacking the first electrode plate, the first separator, the second electrode plate, and the second separator in sequence and winding them, or may be formed by stacking the first separator, the first electrode plate, the second separator, and the second electrode plate in sequence and winding them.

It may be understood that, both the first separator and the second separator have two surfaces, and the first separator and the second separator may be two segments of a separator in different portions, or may be two separators. In the lithium-ion battery of this application, one surface of the first separator or the second separator may face the center of the electrode assembly, and the other surface may face away from the center of the electrode assembly. The inventors have found that by providing the first adhesive layer on at least one of the surface of the first separator facing away from the center of the electrode assembly or the second separator facing away from the center of the electrode assembly, and extending at least one of the first separator or the second separator out from the terminating end of the electrode assembly, at least one of the first separator or the second separator can be bonded to the case through the first adhesive layer, so that the electrode assembly and the case can be integrated as a whole. This improves the safety of the lithium-ion battery, and can also effectively avoid impact of a double-sided adhesive additionally provided between the electrode assembly and the case on the energy density of the lithium-ion battery.

In a first possible implementation, a first adhesive layer is provided on a surface of the first separator facing away from the center of the electrode assembly, and the first separator extends out from a terminating end of the electrode assembly and is bonded to the case through the first adhesive layer.

In a second possible implementation, a first adhesive layer is provided on a surface of the second separator facing away from the center of the electrode assembly, and the second separator extends out from a terminating end of the electrode assembly and is bonded to the case through the first adhesive layer.

In a third possible implementation, a first adhesive layer is provided on both the surface of the first separator facing away from the center of the electrode assembly and the surface of the second separator facing away from the center of the electrode assembly, and the first separator and the second separator extend out from a terminating end of the electrode assembly and are bonded to the case through the first adhesive layers. How the first separator and the second separator are bonded to the case is not particularly limited in this application. For example, the second separator may be first bonded to the first separator through the first adhesive layer on its surface, and then the first separator is bonded to the case through the first adhesive layer on its surface. Alternatively, the portion of the second separator that extends out may slightly exceed the portion of the first separator that extends out, the second separator may be first bonded to the first separator through the first adhesive layer on its surface, the first adhesive layer on the exceeding portion of the second separator is then bonded to the case, and then the first separator is bonded to the case through the first adhesive layer on its surface.

The inventors also found that a bonding area between the first adhesive layer and the case should not be too small, otherwise, bonding performance between the first adhesive layer and the case might be affected. By making the bonding area between the first adhesive layer and the case greater than or equal to 10% of the contact area between the case and the electrode assembly, the electrode assembly and the case can be tightly bonded together. The bonding area between the first adhesive layer and the case in this application may refer to an area of a bonding zone after the first adhesive layer is bonded to the case. The terminating end in this application may refer to a terminating end of an outermost electrode plate in the lithium-ion battery (or electrode assembly) with a winding structure.

The case is not particularly limited in this application. For example, the case may be a packaging bag or another structure that can package the electrode assembly. The electrode assembly in this application may be a lithium-ion battery that has not been packaged or injected with an electrolyte. The first electrode plate and the second electrode plate in this application have opposite polarities. In an optional embodiment, the first electrode plate is a positive electrode plate, the second electrode plate is a negative electrode plate, and the second electrode plate may include a second current collector.

In an embodiment of this application, a second adhesive layer is further provided on at least one of a surface of the first separator facing toward the center of the electrode assembly or a surface of the second separator facing toward the center of the electrode assembly, and at least one of the first separator or the second separator extends out from a terminating end of the second electrode plate and is bonded to a first current collector through the second adhesive layer. The foregoing arrangement allows the electrode assembly to be bonded to the case more reliably, further improving the safety of the lithium-ion battery.

In a first possible implementation, a second adhesive layer is further provided on a surface of the first separator facing the center of the electrode assembly, the first separator extends out from a terminating end of the second electrode plate and is bonded to the first current collector through the second adhesive layer, so that a surface of the first separator facing away from the center of the electrode assembly is bonded to the case through the first adhesive layer, and a surface of the first separator facing toward the center of the electrode assembly is bonded to the first current collector through the second adhesive layer.

In a second possible implementation, a second adhesive layer is further provided on a surface of the second separator facing toward the center of the electrode assembly, the second separator extends out from a terminating end of the second electrode plate and is bonded to the first current collector through the second adhesive layer, so that a surface of the second separator facing away from the center of the electrode assembly is bonded to the case through the first adhesive layer, and a surface of the second separator facing toward the center of the electrode assembly is bonded to the first current collector through the second adhesive layer.

In a third possible implementation, a second adhesive layer is provided on both a surface of the first separator facing toward the center of the electrode assembly and a surface of the second separator facing toward the center of the electrode assembly, and both the first separator and the second separator extend out from a terminating end of the second electrode plate. How the first separator and the second separator are bonded to the case is not particularly limited in this application. For example, the first separator may be first bonded to the case through the first adhesive layer on its surface facing away from the center of the electrode assembly, and then bonded to a surface of the second separator facing away from the center of the electrode assembly through the second adhesive layer on its surface facing toward the center of the electrode assembly, and then the surface of the second separator facing toward the center of the electrode assembly is bonded to the first current collector through the second adhesive layer on its surface.

In an embodiment of this application, a surface of the first separator facing away from the center of an electrode assembly faces a surface of the first electrode plate facing toward the center of the electrode assembly, and a surface of the first separator facing toward the center of the electrode assembly faces a surface of the second electrode plate facing away from the center of the electrode assembly.

In an embodiment of this application, a surface of the second separator facing away from the center of an electrode assembly faces a surface of the second electrode plate facing toward the center of the electrode assembly, and a surface of the second separator facing toward the center of the electrode assembly faces a surface of the first electrode plate facing away from the center of the electrode assembly.

In an embodiment of this application, a bonding force $F_1$ between the first separator or the second separator and the case is from 5 N/m to 55 N/m in a bonding zone between the first separator or the second separator and the case. In a first possible implementation, when the first separator is bonded to the case, a bonding force $F_1$ between the first separator and the case is from 5 N/m to 55 N/m in a bonding zone between the first separator and the case. In a second possible implementation, when the second separator is bonded to the case, a bonding force $F_1$ between the second separator and the case is from 5 N/m to 55 N/m in a bonding zone between the second separator and the case. By controlling the bonding force $F_1$ within the foregoing range, bonding performance between the separator and the case may be further improved.

In an embodiment of this application, a bonding force $F_2$ between the first separator or the second separator and the first current collector is from 5.01 N/m to 60 N/m. By controlling the bonding force $F_2$ within the foregoing range, bonding performance between the separator and the case may be further improved.

In a first possible implementation, when the first separator is bonded to the first current collector, a bonding force $F_2$ between the first separator and the first current collector is from 5.01 N/m to 60 N/m. In a second possible implementation, when the second separator is bonded to the first current collector, a bonding force $F_2$ between the second separator and the first current collector is from 5.01 N/m to 60 N/m.

In an embodiment of this application, a bonding force between the first separator and a surface of the first current collector facing away from the center of the electrode assembly is $F_2$, and a bonding force between the first separator and the case is $F_1$, then a difference between $F_2$ and $F_1$ is from 1 N/m to 15 N/m; or a bonding force between the second separator and a surface of the first current collector facing away from the center of the electrode assembly is $F_2$, and a bonding force between the second separator and the case is $F_1$, then a difference between $F_2$ and $F_1$ is from 1 N/m to 15 N/m. The foregoing arrangement allows both surfaces of the separator subject to even pressure, and prevents the lithium-ion battery from being damaged due to uneven pressure on the two surfaces during a fall, thereby further improving the safety of the lithium-ion battery.

In an embodiment of this application, along a winding direction of the electrode assembly, a bonding area between a portion of the first separator exceeding a terminating end of the second electrode plate and a surface of the first current collector facing away from the center of the electrode assembly is $S_1$, and a bonding area between the portion of the first separator exceeding the terminating end of the second electrode plate and the case is $S_2$, $S_1$ is greater than $S_2$; or a bonding area between a portion of the second separator exceeding a terminating end of the second electrode plate and a surface of the first current collector facing away from the center of the electrode assembly is $S_1$, and a bonding area between the portion of the second separator exceeding the terminating end of the second electrode plate and the case is $S_2$, $S_1$ is greater than $S_2$. The foregoing arrangement enables a greater bonding force between the separator and the surface of the first current collector facing away from the center of the electrode assembly, achieving a more reliable bonding, and ensuring that the components of the electrode assembly are bonded as a whole. This effectively prevents the structure of the lithium-ion battery from being damaged during a fall, and further improves the safety of the lithium-ion battery.

In an embodiment of this application, along a winding direction of the electrode assembly, the first separator extends out from a terminating end of the electrode assembly, and the second separator exceeds a terminating end of the second electrode plate but does not exceed a terminating end of the first electrode plate. In the foregoing arrangement, the first separator may wrap the second separator, so that the first separator has more area to bond with the first current collector, and the problem of a current collector (aluminum foil) being torn out or the second separator with the inside out can be alleviated, further improving the safety of the lithium-ion battery In an embodiment of this application, a polymer is included in a first adhesive layer and a second adhesive layer, so that the first adhesive layer and the second adhesive layer have excellent bonding performance In an embodiment of this application, monomers forming the polymer may include a first monomer and a second monomer, where the first monomer is propylene, and the second monomer includes at least one of ethylene, vinylidene fluoride, vinyl chloride, butadiene, isoprene, styrene, acrylonitrile, ethylene oxide, propylene oxide, acrylate, vinyl acetate, or caprolactone. In a case that the second monomer is a combination of multiple monomers, the proportions of the monomers are not specifically limited and may be any value as long as requirements of this application are met.

In an embodiment of this application, a polymer is made of particles. In an embodiment of this application, an average particle size of the particles is from 1 μm to m. In an embodiment of this application, the average particle size of the particles is from 2 μm to 5 μm. The polymer of this application with a particle size within the foregoing range enables better bonding in the adhesive layer.

In an embodiment of this application, a first adhesive layer and a second adhesive layer have a thickness of 1 μm to 50 μm. In an embodiment of this application, the first adhesive layer and the second adhesive layer have a thickness of 2 μm to 30 μm. In an embodiment of this application, the first adhesive layer and the second adhesive layer have a thickness of 3 μm to 15 μm. For an adhesive layer with an excessively small thickness (for example, less than 1 μm), a bonding force between the adhesive layer and the case is relatively small; for an adhesive layer with an excessively large thickness (for example, larger than 50 μm), a relative content of the active material contained in an lithium-ion battery decreases, affecting an energy density of the lithium-ion battery. Without being limited to any theory, by controlling the thickness of the adhesive layer within the foregoing range, bonding performance between the separator and the case can be further improved, and impact on the energy density of the lithium-ion battery is relatively small.

In an embodiment of this application, a first monomer accounts for 30 mol % to 95 mol % with respect to a total amount of monomers forming the polymer. In an embodiment of this application, the first monomer accounts for 50 mol % to 90 mol % with respect to the total amount of monomers forming the polymer. In an embodiment of this application, the first monomer accounts for 60 mol % to 80 mol % with respect to the total amount of monomers forming the polymer. In an embodiment of this application, a second monomer accounts for 5 mol % to 70 mol % with respect to the total amount of monomers forming the polymer. In an embodiment of this application, the second monomer accounts for 10 mol % to 50 mol % with respect to the total amount of monomers forming the polymer. In an embodiment of this application, a second monomer accounts for 20 mol % to 40 mol % with respect to the total amount of monomers forming the polymer. By controlling the content of the first monomer and the second monomer within the foregoing ranges, a polymer with excellent bonding performance can be obtained.

In an embodiment of this application, isotacticity of a polymer is from 45% to 80%. In an embodiment of this application, isotacticity of the polymer is from 60% to 80%. When the isotacticity of the polymer is within the foregoing range, an adhesive layer with an appropriate softening temperature and excellent bonding performance can be obtained.

In an embodiment of this application, a softening temperature of a polymer is from 130° C. to 170° C. In an embodiment of this application, the softening temperature of a polymer is from 155° C. to 170° C. By controlling the softening temperature of the polymer of this application, the polymer of this application can have better bonding performance. Particularly, when the foregoing polymer is contained in the adhesive layer of this application, bonding performance between the separator extending out from a terminating end of the electrode assembly and the case can be improved, further improving the safety of the lithium-ion battery.

In an embodiment of this application, a weight-average molecular weight of a polymer is from 5000 g/mol to 1000000 g/mol. In an embodiment of this application, the weight-average molecular weight of the polymer is from 10000 g/mol to 500000 g/mol. When the weight-average molecular weight is within the foregoing range, a polymer with excellent bonding performance can be obtained.

The inventors have found that when a lithium-ion battery falls, the case is the first one experiencing impact, relative displacement occurs between the case and the electrode assembly inside thereof, and thinner electrode plates are more likely to be torn out compared to the thicker case. In an embodiment of this application, a bonding force between the first separator and the first electrode plate is greater than a bonding force between the first separator and the case, thereby ensuring that the components of the electrode assembly are bonded as a whole, effectively preventing the structure of the lithium-ion battery from being damaged during a fall, and further improving the safety of the lithium-ion battery.

Methods for preparing a polymer of this application are not particularly limited, and a preparation method known to a person skilled in the art may be employed, or a preparation method may be selected based on different types of monomers to be used, such as a solution method, a slurry method, or a gas phase method.

For example, in a case that the second monomer is selected from ethylene, the following method may be employed.

A primary catalyst and a co-catalyst are separately dissolved in hexane to obtain a hexane solution of the primary catalyst and a hexane solution of the co-catalyst, and then hexane is added to a reactor. The hexane solution of the primary catalyst and the hexane solution of the co-catalyst are added to the reactor under the protection of nitrogen, propylene and ethylene are introduced, and the temperature is increased to 50° C. to 60° C. During the reaction, the pressure in the reactor is maintained at 0.3 MPa to 0.5 MPa. After reaction for 0.5 h to 2 h, acidified ethanol is used to terminate the reaction, and the obtained product is washed 3 to 5 times with absolute ethanol, filtered, and then dried in a vacuum drying oven at 50° C. to 70° C. for 3 h to 5 h.

The primary catalyst and the co-catalyst are not particularly limited in this application, as long as the objective of this application can be achieved. For example, a metallocene catalytic system is used, where a primary catalyst includes a metallocene complex (for example, ferrocene or its derivatives), and a co-catalyst includes methylaluminoxane. The amount of the primary catalyst and the co-catalyst added is not particularly limited in this application as long as the objective of this application can be achieved. In addition, the reactor may be vacuumed before reaction, and then nitrogen is used for replacement in the reactor for 3 to 5 times to make the reactor clean.

In a case that the second monomer is selected from butadiene, except that the ethylene in the foregoing preparation method of the propylene-ethylene copolymer is replaced with butadiene, the rest is the same as the foregoing preparation method of the propylene-ethylene copolymer.

In a case that the second monomer is selected from acrylate, the difference from the foregoing preparation method of the propylene-ethylene copolymer is that: the ethylene in the propylene-ethylene copolymer preparation method is replaced with acrylate, hexane, the hexane solution of the primary catalyst, and the hexane solution of the co-catalyst are added to the reactor under the protection of nitrogen, the acrylate is added, and then propylene is introduced. The rest is the same as the foregoing preparation method of the propylene-ethylene copolymer.

The acrylate monomer may be selected from any one of methyl acrylate, methyl methacrylate, ethyl acrylate, ethyl methacrylate, butyl acrylate, isooctyl acrylate, or hydroxyethyl acrylate.

For the copolymerization of other monomers, details are not described in this application, and preparation methods known in the art may be used.

The positive electrode plate is not particularly limited in this application as long as the objective of this application can be achieved. For example, the positive electrode plate generally includes a positive electrode current collector and a positive electrode active material layer. The positive electrode current collector is not particularly limited and may be any positive electrode current collector known in the art, such as aluminum foil, aluminum alloy foil, or a composite current collector. The positive electrode active material layer includes a positive electrode active material. The positive electrode active material is not particularly limited, and any positive electrode active material known in the art may be used, for example, including at least one of the following: lithium nickel cobalt manganese oxide (811, 622, 523, 111), lithium nickel cobalt aluminate, lithium iron phosphate, lithium-rich manganese-based materials, lithium cobalt oxide, lithium manganate, lithium iron manganese phosphate, or lithium titanate.

The negative electrode plate is not particularly limited in this application as long as the objective of this application can be achieved. For example, the negative electrode plate generally includes a negative electrode current collector and a negative electrode active material layer. The negative electrode current collector is not particularly limited and may be any negative electrode current collector known in the art, such as copper foil, aluminum foil, aluminum alloy foil, or a composite current collector. The negative electrode active material layer includes a negative electrode active material. The negative electrode active material is not particularly limited, and any negative electrode active material known in the art may be used, for example, including at least one of the following: artificial graphite, natural graphite, mesocarbon microbeads, soft carbon, hard carbon, silicon, silicon carbon, or lithium titanate.

The lithium-ion battery of this application further includes an electrolyte. The electrolyte may be one or more of a gel electrolyte, a solid electrolyte, and an electrolyte solution, or the electrolyte solution contains a lithium salt and a non-aqueous solvent.

In some embodiments of this application, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ may be selected as the lithium salt because it can provide a high ionic conductivity and improve the cycle performance. The non-aqueous solvent may be a carbonate compound, a carboxylate compound, an ether compound, another organic solvent, or a combination thereof. The carbonate compound may be a linear carbonate compound, a cyclic carbonate compound, a fluorocarbonate compound, or a combination thereof.

An example of the linear carbonate compound is dimethyl carbonate (DMC), diethyl carbonate (DEC), dipropyl carbonate (DPC), methyl propyl carbonate (MPC), ethylene propyl carbonate (EPC), ethyl methyl carbonate (MEC), or a combination thereof. An example of the cyclic carbonate compound is ethylene carbonate (EC), propylene carbonate (PC), butylene carbonate (BC), vinyl ethylene carbonate (VEC), or a combination thereof. An example of the fluorocarbonate compound is fluoroethylene carbonate (FEC), 1,2-difluoroethylene carbonate, 1,1-difluoroethylene carbonate, 1,1,2-tricarbonate fluoroethylene, 1,1,2,2-tetrafluoroethylene carbonate, 1-fluoro-2-methylethylene carbonate, 1-fluoro-1-methylethylene carbonate, carbonic acid 1,2-Difluoro-1-methylethylene, 1,1,2-trifluoro-2-methylethylene carbonate, trifluoromethylethylene carbonate, or a combination thereof.

An example of the foregoing carboxylate compound is methyl formate, methyl acetate, ethyl acetate, n-propyl acetate, tert-butyl acetate, methyl propionate, ethyl propionate, propyl propionate, γ-butyrolactone Ester, caprolactone, valerolactone, mevalonolactone, caprolactone, or a combination thereof.

An example of the ether compound is dibutyl ether, tetraglyme, diglyme, 1,2-dimethoxyethane, 1,2-diethoxyethane, ethoxymethoxyethane, 2-methyltetrahydrofuran, tetrahydrofuran, or a combination thereof.

An example of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

This application further provides an electronic apparatus with good safety performance, including the electrochemical apparatus according to any embodiment of this application.

The electronic apparatus according to this application is not particularly limited, and may be any known electronic apparatus used in the prior art. In some embodiments, the electronic apparatus may include, but is not limited to: notebook computers, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power supplies, motors, automobiles, motorcycles, assisted bicycles, bicycles, lighting apparatuses, toys, game machines, clocks, electric tools, flashlights, cameras, large household storage batteries or lithium-ion capacitors.

The procedure for preparing an electrochemical apparatus is known to a person skilled in the art, and is not particularly limited in this application. For example, a lithium-ion battery may be prepared through the following procedure: stacking a positive electrode, a separator, and a negative electrode in sequence, winding them as needed and placing them into a case, enabling the separator to extend out from a terminating end of an electrode assembly to bond with the case through a first adhesive layer, injecting an electrolyte into the case, and performing a sealing operation. In addition, an over-current protection element, a guide, or the like may also be placed into the case as needed, so as to prevent a pressure inside the lithium ion battery from rising too high, and the lithium ion battery from over-charging and over-discharging.

In this application, the term "isotacticity" refers to the percentage of isotactic polymer in the total amount of polymer.

The term "particle size" refers to an average particle size of polymer particles.

This application provides an electrochemical apparatus and an electronic apparatus, where the electrochemical apparatus includes a case and a wound electrode assembly disposed inside the case. A first adhesive layer is provided on at least one of a surface of a first separator facing away from a center of the electrode assembly or a second separator facing away from the center of the electrode assembly, at least one of the first separator or the second separator extends out from a terminating end of the electrode assembly and is bonded to the case through the first adhesive layer, and a bonding area between the first adhesive layer and the case is greater than or equal to 10% of a contact area between the case and the electrode assembly, so that the electrode assembly and the case are tightly bonded together, improving safety of the lithium-ion battery. In addition, because no double-sided adhesive is additionally provided between the electrode assembly and the case, impact of the double-sided adhesive on the energy density of the lithium-ion battery can be avoided.

BRIEF DESCRIPTION OF DRAWINGS

To describe the technical solutions in this application and in the prior art more clearly, the following briefly describes the accompanying drawings required for describing embodiments and the prior art. Apparently, the accompanying drawings in the following description show merely some embodiments of this application.

In the figures: 1. first electrode plate, 2. second electrode plate, 4. case, 6. tab, 7. first adhesive layer, 8. second adhesive layer, 11. first current collector, 21. second current collector, 31. first separator, and 32. second separator.

DETAILED DESCRIPTION

To make the objectives, technical solutions, and advantages of this application clearer, the following describes this application in detail with reference to accompanying drawings and embodiments. Apparently, the described embodiments are merely some but not all of the embodiments of this application It should be noted that in specific implementations of this application, a lithium-ion battery is used as an example of an electrochemical apparatus to explain this application. However, the electrochemical apparatus of this application is not limited to the lithium-ion battery.

Figure 1:
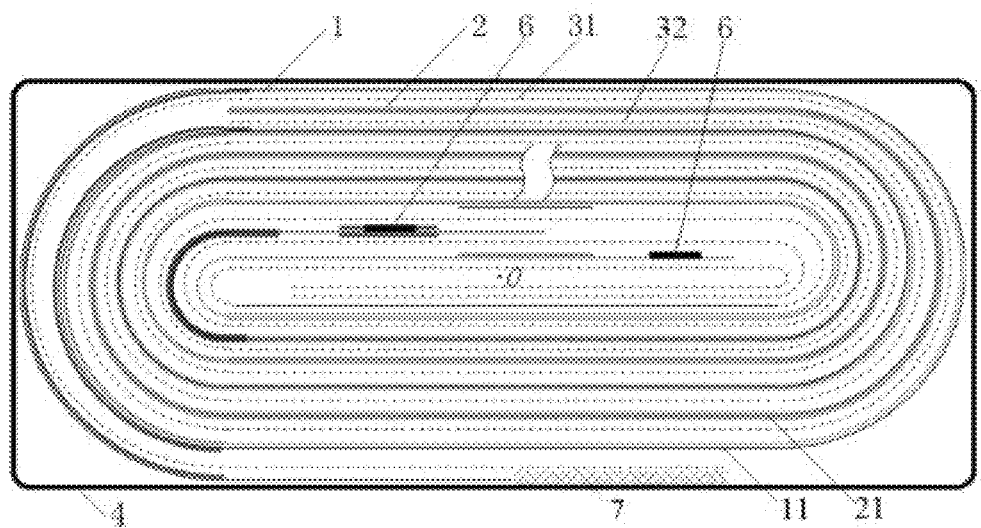
FIG. 1 is a schematic structural diagram of an electrochemical apparatus according to an embodiment of this application.

FIG. 1 is a schematic structural diagram of an electrochemical apparatus according to an embodiment of this application. As shown in FIG. 1, the electrochemical apparatus includes a case 4 and a wound electrode assembly disposed inside the case 4, where the electrode assembly includes a first electrode plate 1, a second electrode plate 2 having a polarity opposite to that of the first electrode plate 1, and a first separator 31 or a second separator 32 provided between the first electrode plate 1 and the second electrode plate 2, and the first electrode plate 1 includes a first current collector 11. A first adhesive layer 7 is provided on a surface of the first separator 31 facing away from the center O of the electrode assembly, and the first separator 31 extends out from a terminating end of the electrode assembly and is bonded to the case 4 through the first adhesive layer 7. A tab 6 is also shown in FIG. 1, and the second electrode plate 2 may include a second current collector 21.

Figure 2:
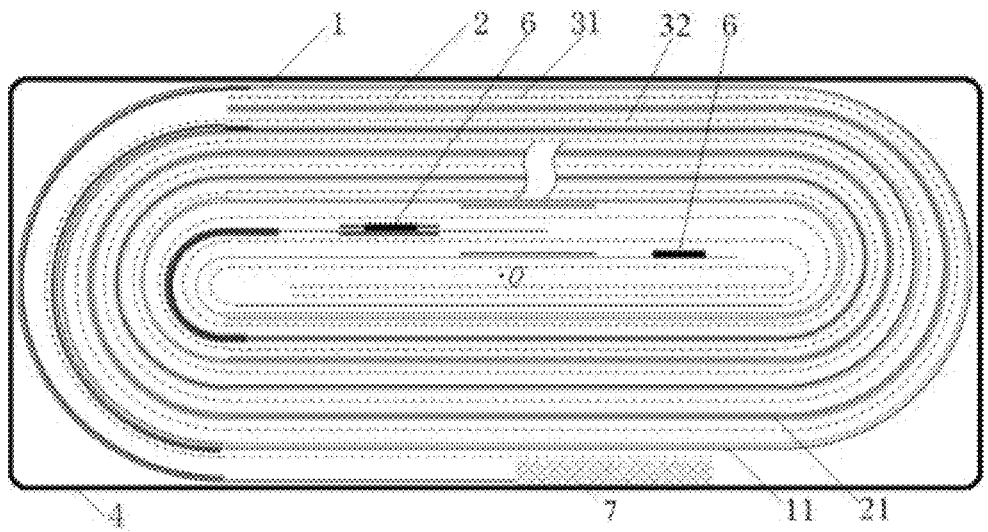
FIG. 2 is a schematic structural diagram of an electrochemical apparatus according to another embodiment of this application.

FIG. 2 is a schematic structural diagram of an electrochemical apparatus according to another embodiment of this application. As shown in FIG. 2, a first adhesive layer 7 is provided on a surface of the second separator 32 facing away from the center O of the electrode assembly, and the second separator 32 extends out from a terminating end of the electrode assembly and is bonded to the case 4 through the first adhesive layer 7.

Figure 3:
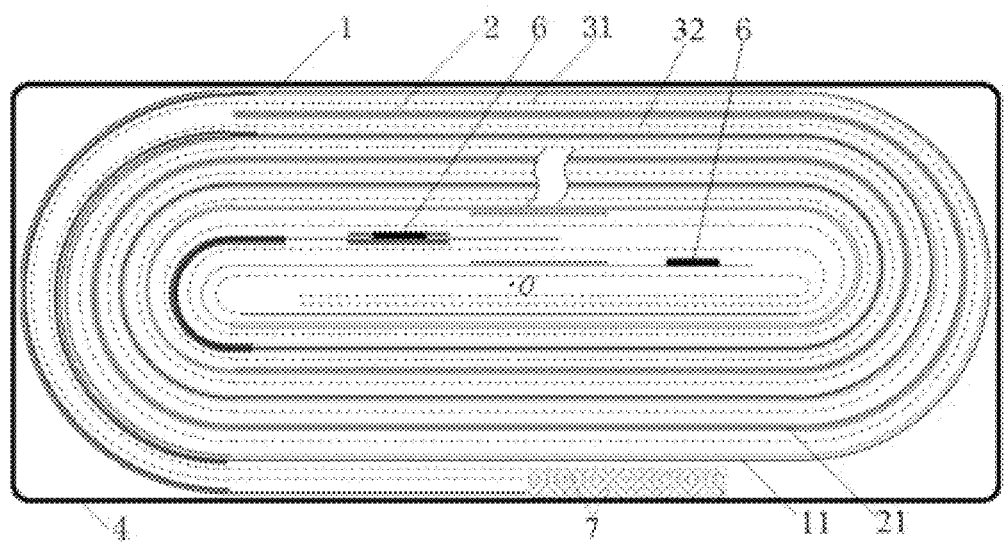
FIG. 3 is a schematic structural diagram of an electrochemical apparatus according to a still another embodiment of this application.

FIG. 3 is a schematic structural diagram of an electrochemical apparatus according to a still another embodiment of this application. As shown in FIG. 3, a first adhesive layer 7 is provided on both a surface of the first separator 31 facing away from the center O of the electrode assembly and a surface of the second separator 32 facing away from the center O of the electrode assembly, and the first separator 31 and the second separator 32 extend out from a terminating end of the electrode assembly and are bonded to the case 4 through the first adhesive layers 7.

Figure 4:
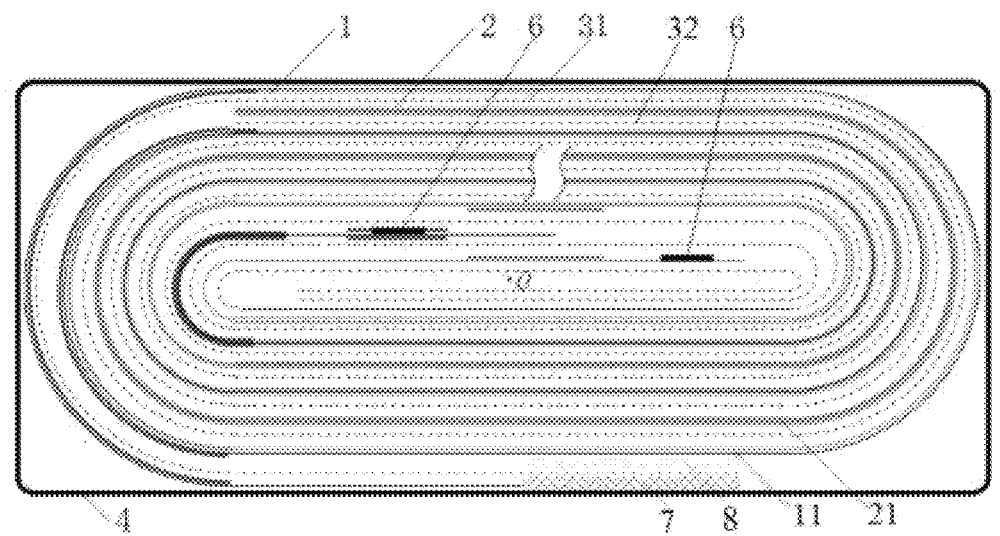
FIG. 4 is a schematic structural diagram of an electrochemical apparatus according to a fourth embodiment of this application.

FIG. 4 is a schematic structural diagram of an electrochemical apparatus according to a fourth embodiment of this application. As shown in FIG. 4, a second adhesive layer 8 is further provided on a surface of the first separator 31 facing toward the center O of the electrode assembly, and the first separator 31 extends out from a terminating end of the second electrode plate 2 and is bonded to the first current collector 11 through the second adhesive layer 8, so that a surface of the first separator 31 facing away from the center of the electrode assembly is bonded to the case 4 through the first adhesive layer 7, and the surface of the first separator 31 facing toward the center O of the electrode assembly is bonded to the first current collector 11 through the second adhesive layer 8.

Figure 5:
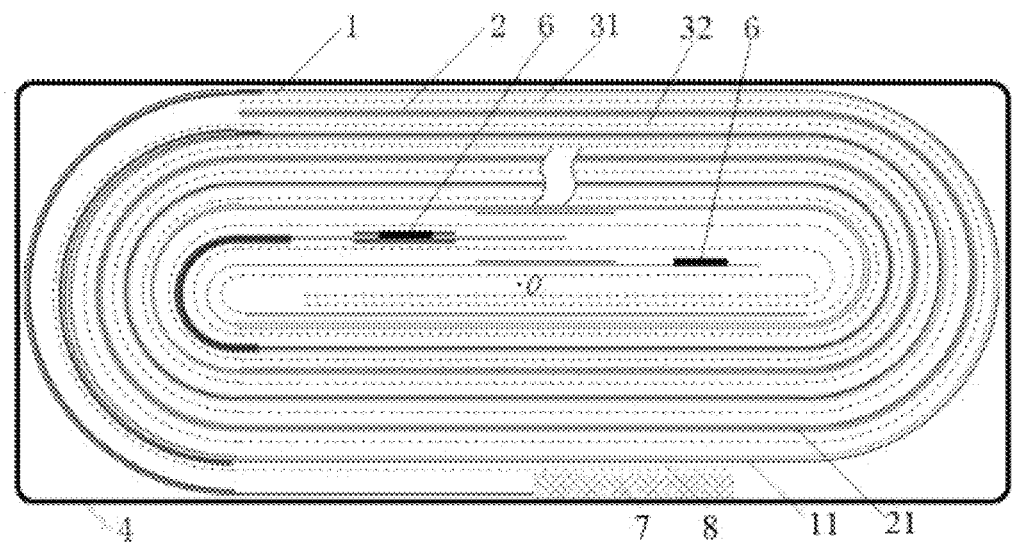
FIG. 5 is a schematic structural diagram of an electrochemical apparatus according to a fifth embodiment of this application.

FIG. 5 is a schematic structural diagram of an electrochemical apparatus according to a fifth embodiment of this application. As shown in FIG. 5, a second adhesive layer 8 is further provided on a surface of the second separator 32 facing toward the center O of the electrode assembly, and the second separator 32 extends out from a terminating end of the second electrode plate 2 and is bonded to the first current collector 11 through the second adhesive layer 8, so that a surface of the second separator 32 facing away from the center O of the electrode assembly is bonded to the case 4 through the first adhesive layer 7, and the surface of the second separator 32 facing toward the center O of the electrode assembly is bonded to the first current collector 11 through the second adhesive layer 8.

Figure 6:
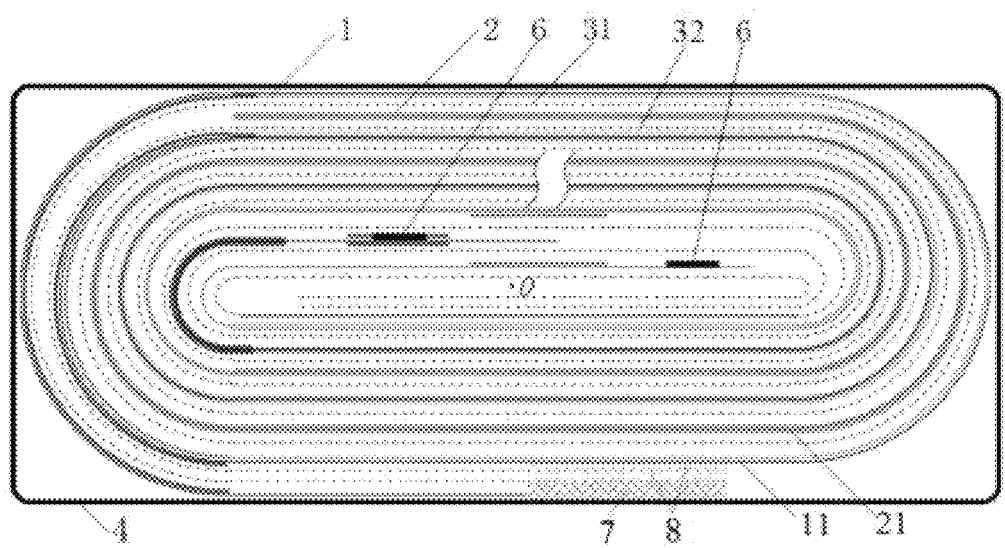
FIG. 6 is a schematic structural diagram of an electrochemical apparatus according to a sixth embodiment of this application.

FIG. 6 is a schematic structural diagram of an electrochemical apparatus according to a sixth embodiment of this application. As shown in FIG. 6, a second adhesive layer 8 is provided on both a surface of the first separator 31 and a surface of the second separator 32 that face toward the center O of the electrode assembly, and both the first separator 31 and the second separator 32 extend out from a terminating end of the second electrode plate 2. The first separator 31 may be first bonded to the case 4 through the first adhesive layer 7 on its surface facing away from the center O of the electrode assembly, and then bonded to a surface of the second separator 32 facing away from the center O of the electrode assembly through the second adhesive layer 8 on its surface facing toward the center O of the electrode assembly, and then the surface of the second separator 32 facing toward the center O of the electrode assembly is bonded to the first current collector 11 through the second adhesive layer 8 on its surface.

Figure 7:
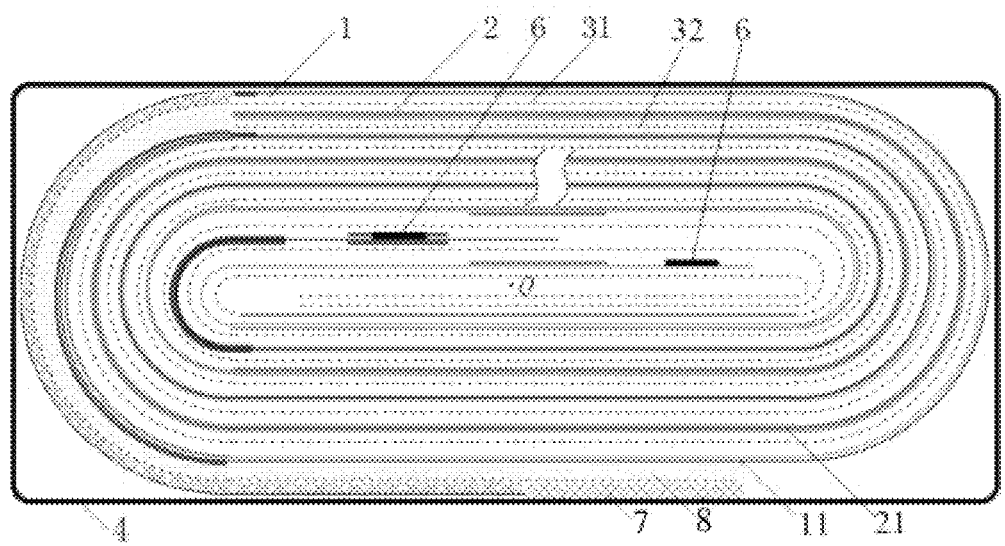
FIG. 7 is a schematic structural diagram of an electrochemical apparatus according to a seventh embodiment of this application.

FIG. 7 is a schematic structural diagram of an electrochemical apparatus according to a sixth embodiment of this application. As shown in FIG. 7, along a winding direction of the electrode assembly, a bonding area between a portion of the first separator 31 exceeding a terminating end of the second electrode plate 2 and the first current collector 11 is greater than a bonding area between a portion of the first separator 31 exceeding the terminating end of the second electrode plate 2 and the case 4.

Figure 8:
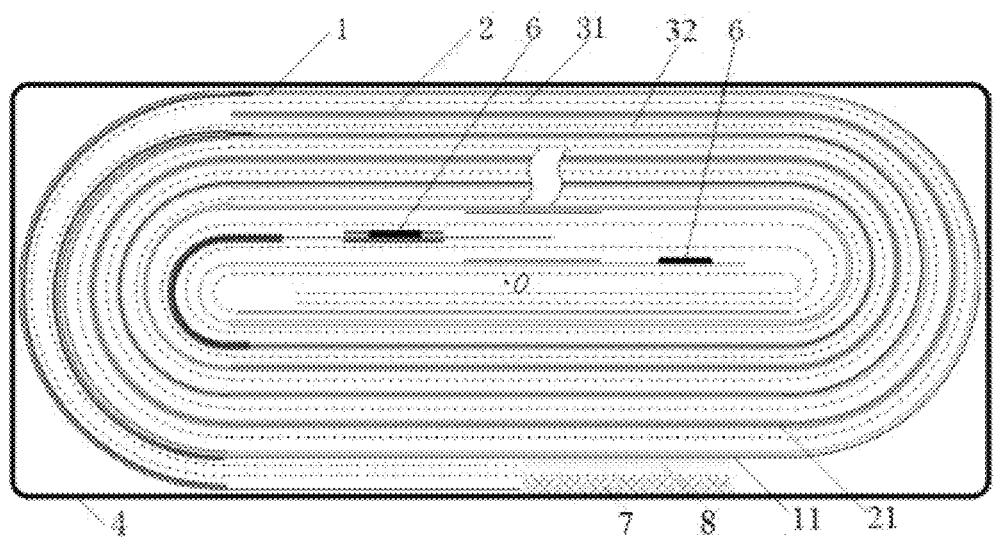
FIG. 8 is a schematic structural diagram of an electrochemical apparatus according to an eighth embodiment of this application.

FIG. 8 is a schematic structural diagram of a lithium-ion battery according to an eighth embodiment of this application. As shown in FIG. 8, in the lithium-ion battery, the first separator 31 extends out from a terminating end of the electrode assembly, and the second separator 32 exceeds a terminating end of the second electrode plate 2 but does not exceed a terminating end of the first electrode plate 1. The first separator 31 wraps the second separator 32, so that the first separator 31 has larger area to bond with the first current collector 11, and the problem of a current collector (aluminum foil) being torn out or the second separator 32 with the inside out can be alleviated.

Figure 9A:
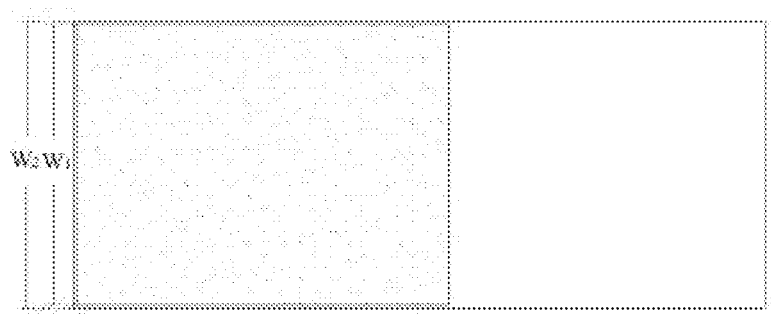
FIG. 9A is a schematic diagram of a manner in which a first adhesive layer of a separator is bonded to a case according to an embodiment of this application.
Figure 9B:
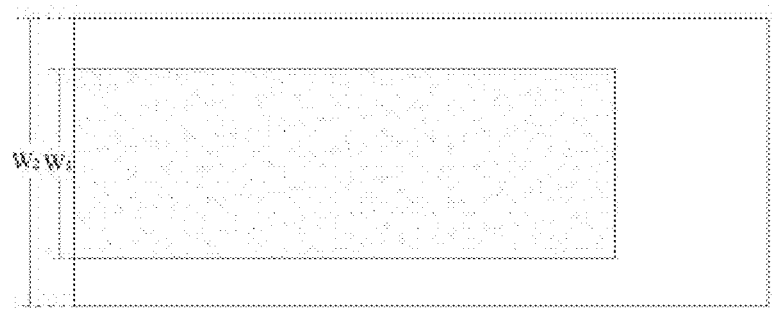
FIG. 9B is a schematic diagram of a manner in which a first adhesive layer of a separator is bonded to a case according to another embodiment of this application.
Figure 9C:
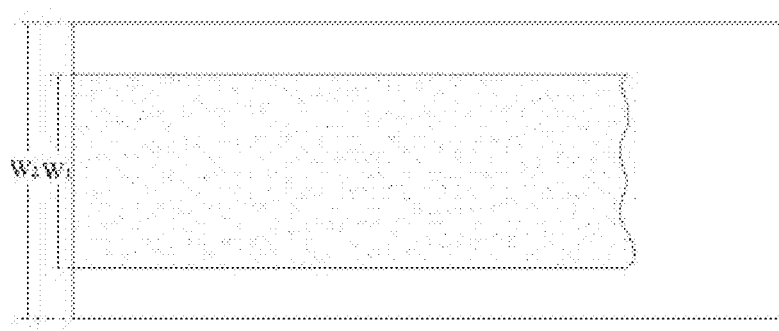
FIG. 9C is a schematic diagram of a manner in which a first adhesive layer of a separator is bonded to a case according to a still another embodiment of this application.

FIG. 9A is a schematic diagram of a manner in which a first adhesive layer of a separator is bonded to the case according to an embodiment of this application. A width $w_1$ of the first adhesive layer may be equal to a width $w_2$ of the case, or slightly less than the width $w_2$ of the case. FIG. 9B is a schematic diagram of a manner in which a first adhesive layer of a separator is bonded to the case according to another embodiment of this application. A width $w_1$ of the first adhesive layer may be less than a width $w_2$ of the case. FIG. 9C is a schematic diagram of a manner in which a first adhesive layer of a separator is bonded to the case according to a still another embodiment of this application. A width $w_1$ of the first adhesive layer may be less than a width $w_2$ of the case, and a terminating end of the first adhesive layer may be an irregular shape (for example, a wave shape). In the manners in which an adhesive layer of a separator is bonded to the case shown in FIG. 9A to FIG. 9C, it is only required that a bonding area between the first adhesive layer and the case be greater than or equal to 10% of a contact area between the case and the electrode assembly.

EXAMPLES

In the following, examples and comparative examples are given to describe the implementation of this application in more detail. Various tests and evaluations are performed according to the following described methods. In addition, unless otherwise specified, "part" and "%" are measured by mass.

Test Method and Device

Lithium-Ion Battery Drop Test

After the lithium-ion battery was fully charged at 0.5 C, it was left open-circuited for 2 h (hours), and then the thickness, voltage and internal resistance of the lithium-ion battery were measured. Then the to-be-tested lithium-ion battery is left freely falling to a hardwood board with a thickness ranging from 18 mm to 20 mm at a height of 1.2 m. The drop test should be performed for six planes of the lithium-ion battery, so the total number of drops for each lithium-ion battery was 6. The lithium-ion battery must have no obvious deformation, no leakage, no fire, and no explosion, otherwise the test fails.

Heavy Impact Test

After the lithium-ion battery was fully charged at 0.5 C, it was left open-circuited for 2 h. According to Article 7.7 of the national standard GB31241-2014, a metal rod with a diameter of 15.8 mm±0.2 mm was placed on the upper surface of the geometric center of the lithium-ion battery, an object weighing 9.1 kg±0.1 kg was left freely falling from a height of 610 mm±25 mm to hit the surface of the lithium-ion battery with the metal rod, and the lithium-ion battery was observed for 6 h. The battery must have no leakage, no fire, and no explosion, otherwise the test fails.

Bonding Force Test

A fully discharged lithium-ion battery was disassembled, and a bonding portion between the separator (the first separator or the second separator) and the first electrode plate and a bonding portion between the separator and the case were cut into strip samples of 10 mm×100 mm. The samples were pasted onto a stainless-steel plate by using a double-sided adhesive, and a 180° peeling force test method was used to test the bonding force between the separator and the first electrode plate and between the separator and the case. The test speed was 300 mm/min, and the test length was 40 mm.

Polymer Weight-Average Molecular Weight Test

The gel permeation chromatography (GPC) method was used to test the weight-average molecular weight of a polymer. In this application, the weight-average molecular weight refers to an average molecular weight based on mass statistics.

Polymer Softening Temperature Test

A universal differential scanning calorimeter (DSC) method was used. Specifically, 5 mg of polymer sample was taken and heated to 150° C. at a heating rate of 5° C./min, a DSC curve was acquired, and a polymer softening temperature was determined from the obtained DSC curve.

Polymer Isotacticity Test

The polymer isotacticity was tested according to the FTIR (Fourier Transform Infrared Spectroscopy) method, where the FTIR method complied with the national standard GB/T 21186-2007 "Fourier Transform Infrared Spectrometer".

Example 1

<1-1. Preparation of a First Separator>
<1-1-1. Preparation of a Polymer>

In a 1 L stainless-steel reactor, under the protection of nitrogen, 77 parts (volume fraction) of hexane solvent, 19 parts (volume fraction) of hexane solution of primary catalyst ferrocene (with 70 mg/L of ferrocene), and 4 parts (volume fraction) of hexane solution of co-catalyst methylaluminoxane (with 10 mg/L of methylaluminoxane) were added, polyvinylidene fluoride (PVDF) was added, then propylene was introduced, the temperature was increased to 50° C., and the reactor pressure was controlled to be 0.4 MPa. The amount of propylene/vinylidene fluoride added was adjusted to control a molar ratio of the first monomer to the second monomer to be 60:40. After reaction for 1 h, acidified ethanol was used to terminate the reaction to obtain a propylene-vinylidene fluoride copolymer, and the obtained product was washed 3 times with absolute ethanol, filtered, and dried in a vacuum drying oven at 60° C. for 4 h. The prepared polymer had an average particle size of 2 m, a softening temperature of 170° C., an isotacticity of 80%, and a weight-average molecular weight of 100000 g/mol.

<1-1-2. Preparation of an Adhesive Layer Slurry>

Polyvinylidene fluoride (PVDF), polyacrylic acid (PAA), and the prepared polymer were mixed at a mass ratio of 70:10:20 to obtain a mixture, and then the mixture was dissolved in acetone to obtain an adhesive layer slurry with a solid content of 40%.

<1-1-3. Preparation of a Separator with an Adhesive Layer>

The adhesive layer slurry was uniformly applied on two surfaces at a terminating end of the 9 μm-thick polyethylene (PE) separator substrate to form a first adhesive layer and a second adhesive layer. Both the first adhesive layer and the second adhesive layer were 3 μm thick. The same method was used to prepare the second separator.

<1-2. Preparation of a Positive Electrode Plate>

Lithium cobaltate as a positive electrode active material, acetylene black, and polyvinylidene fluoride (PVDF) were mixed at a mass ratio of 94:3:3, and then N-methylpyrrolidone (NMP) was added as a solvent to prepare a slurry with a solid content of 75%. The slurry was stirred well. The slurry was uniformly applied on one surface of aluminum foil with a thickness of 12 μm, and dried at 90° C. The aluminum foil was cold pressed to obtain a positive electrode plate having a positive electrode active material layer with a thickness of 100 μm. Then the foregoing steps were repeated on the other surface of the positive electrode plate to obtain a positive electrode plate coated with positive electrode active material layers on both surfaces. The positive electrode plate was welded with a tab and left for later use.

<1-3. Preparation of a Negative Electrode Plate>

Artificial graphite as a negative electrode active material, acetylene black, styrene-butadiene rubber, and sodium carboxymethyl cellulose were mixed at a mass ratio of 96:1:1.5:1.5, and then deionized water was added as a solvent to prepare a slurry with a solid content of 70%. The slurry was stirred well. The slurry was uniformly applied on one surface of copper foil with a thickness of 8 μm, and dried at 110° C. The copper foil was cold pressed to obtain a negative electrode plate having a negative electrode active material layer with a thickness of 150 μm. Then the foregoing coating steps were repeated on the other surface of the negative electrode plate to obtain a negative electrode plate coated with negative electrode active material layers on both surfaces. The negative electrode plate was welded with a tab and left for later use.

<1-4. Preparation of an Electrolyte>

In an environment with a water content less than 10 ppm, ethylene carbonate (EC) as a non-aqueous organic solvent, diethyl carbonate (DEC), propylene carbonate (PC), polypropylene (PP), and vinylene carbonate (VC) were mixed at a mass ratio of 20:30:20:28:2, and then lithium hexafluorophosphate ($LiPF_6$) was added to the non-aqueous organic solvent, dissolved and well mixed to obtain an electrolyte, where a mass ratio of $LiPF_6$ to the non-aqueous solvent was 8:92.

<1-5. Preparation of a Lithium-Ion Battery>

Figure 10:
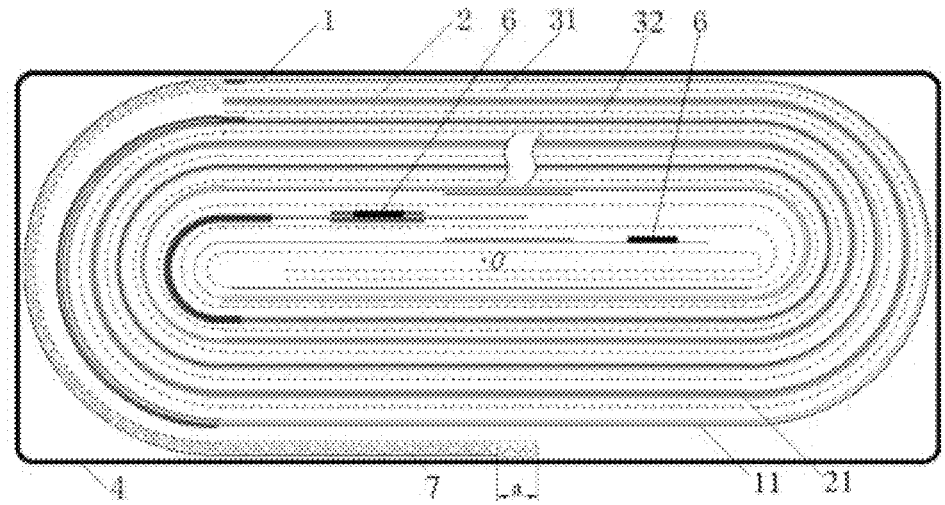
FIG. 10 is a schematic structural diagram of a lithium-ion battery according to Example 1 of this application.

The prepared positive electrode plate, the first separator, the negative electrode plate, and the second separator were stacked in sequence, so that the first separator and the second separator were between the positive electrode plate and the negative electrode plate for separation, and winding was performed to obtain an electrode assembly. The electrode assembly was placed into the case (an aluminum-plastic film packaging bag), and the first separator extended out from a terminating end of the electrode assembly, and was hot pressed to bond the first adhesive layer of the first separator at the terminating end with the case (the aluminum-plastic film packaging bag). A bonding area between the first adhesive layer and the case is 10% of a contact area between the case and the electrode assembly (zone a shown in FIG. 10). The electrode assembly was dehydrated at a temperature of 80° C., and the prepared electrolyte was injected. After steps including vacuum packaging, standing, chemical conversion, and shaping, a lithium-ion battery was obtained.

Example 2

Figure 11:
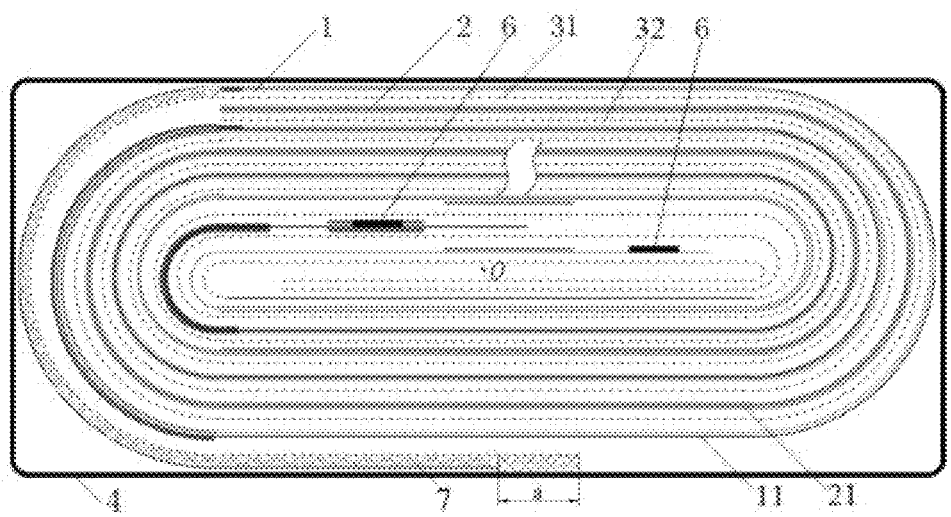
FIG. 11 is a schematic structural diagram of a lithium-ion battery according to Example 2 of this application.

Example 2 was the same as Example 1 except that a bonding area between the first adhesive layer and the case was 20% of a contact area between the case and the electrode assembly (zone a shown in FIG. 11) in <Preparation of a lithium-ion battery>.

Example 3

Figure 12:
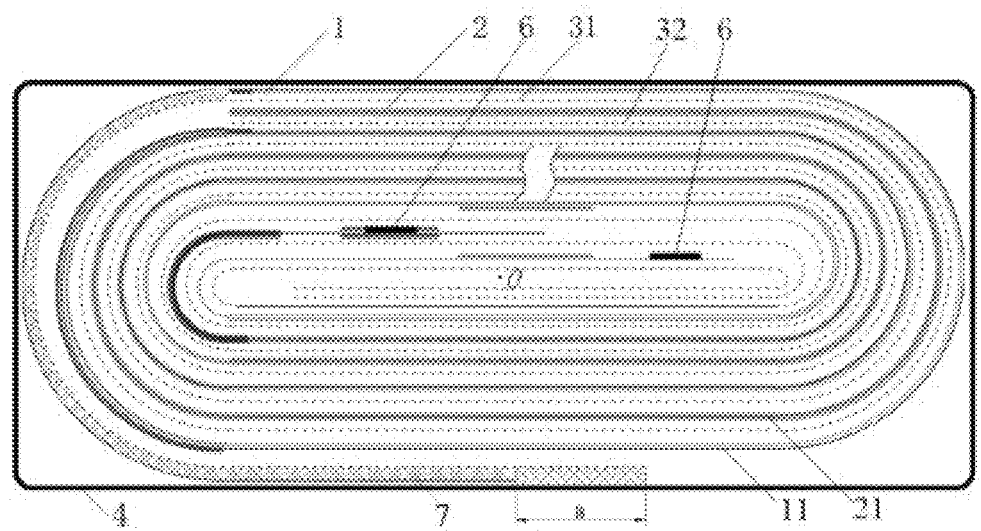
FIG. 12 is a schematic structural diagram of a lithium-ion battery according to Example 3 of this application.

Example 3 was the same as Example 1 except that a bonding area between the first adhesive layer and the case was 30% of a contact area between the case and the electrode assembly (zone a shown in FIG. 12) in <Preparation of a lithium-ion battery>.

Example 4

Figure 13:
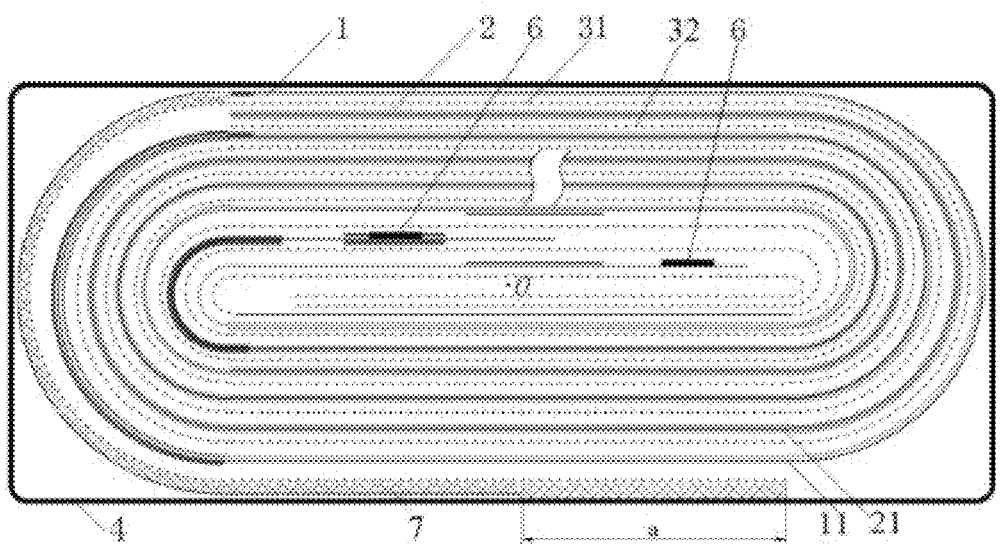
FIG. 13 is a schematic structural diagram of a lithium-ion battery according to Example 4 of this application.

Example 4 was the same as Example 1 except that a bonding area between the first adhesive layer and the case was 50% of a contact area between the case and the electrode assembly (zone a shown in FIG. 13) in <Preparation of a lithium-ion battery>.

Example 5

Figure 14:
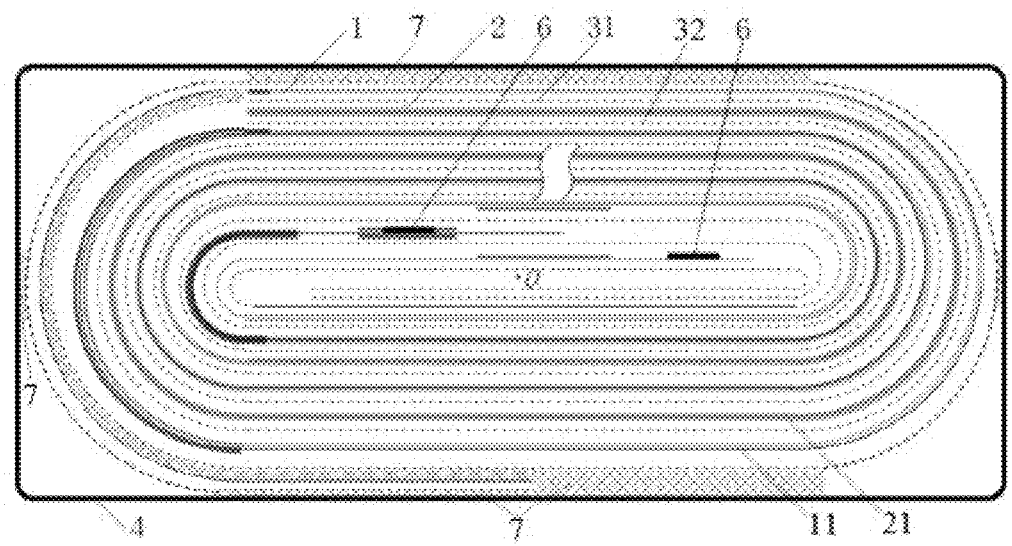
FIG. 14 is a schematic structural diagram of a lithium-ion battery according to Example 5 of this application.

Example 5 was the same as Example 1 except that a bonding area between the first adhesive layer and the case was 100% of a contact area between the case and the electrode assembly (zone a shown in FIG. 14) in <Preparation of a lithium-ion battery>.

Example 6

Example 6 was the same as Example 3 except that polyvinylidene fluoride (PVDF), polyacrylic acid (PAA), and the prepared polymer were mixed at a mass ratio of 60:10:30 in <Preparation of an adhesive layer>.

Example 7

Example 7 was the same as Example 3 except that polyvinylidene fluoride (PVDF), polyacrylic acid (PAA), and the prepared polymer were mixed at a mass ratio of 50:10:40 in <Preparation of an adhesive layer>.

Example 8

Example 8 was the same as Example 3 except that polyvinylidene fluoride (PVDF), polyacrylic acid (PAA), and the prepared polymer were mixed at a mass ratio of 40:10:50 in <Preparation of an adhesive layer>.

Example 9

Example 9 was the same as Example 7 except that the polymer softening temperature was adjusted to 160° C. and the isotacticity to 70% in <Preparation of a polymer>.

Example 10

Example 10 was the same as Example 7 except that the polymer softening temperature was adjusted to 155° C. and the isotacticity to 65% in <Preparation of a polymer>.

Example 11

Example 11 was the same as Example 7 except that the polymer softening temperature was adjusted to 150° C. and the isotacticity to 60% in <Preparation of a polymer>.

Example 12

Example 12 was the same as Example 7 except that the polymer softening temperature was adjusted to 140° C. and the isotacticity to 55% in <Preparation of a polymer>.

Example 13

Example 13 was the same as Example 7 except that the polymer softening temperature was adjusted to 135° C. and the isotacticity to 50% in <Preparation of a polymer>.

Example 14

Example 14 was the same as Example 7 except that the polymer softening temperature was adjusted to 130° C. and the isotacticity to 45% in <Preparation of a polymer>.

Example 15

Example 15 was the same as Example 5 except for <Preparation of a polymer>.

<Preparation of a Polymer>

In a 1 L stainless-steel reactor, under the protection of nitrogen, 77 parts (volume fraction) of hexane solvent, 19 parts (volume fraction) of hexane solution of primary catalyst ferrocene (with 70 mg/L of ferrocene), and 4 parts (volume fraction) of hexane solution of co-catalyst methylaluminoxane (with 10 mg/L of methylaluminoxane) were added, a propylene/butadiene mixed gas was added, the temperature was increased to 50° C., and the reactor pressure was controlled to be 0.4 MPa. The amount of propylene/butadiene added was adjusted to control the molar ratio of the first monomer to the second monomer to be 30:70. After reaction for 1 h, acidified ethanol was used to terminate the reaction to obtain a propylene-butadiene copolymer, and the obtained product was washed 3 times with absolute ethanol, filtered, and dried in a vacuum drying oven at 60° C. for 4 h.

Example 16

Example 16 was the same as Example 5 except for <Preparation of a polymer>.
<Preparation of a Polymer>

In a 1 L stainless-steel reactor, under the protection of nitrogen, 77 parts (volume fraction) of hexane solvent, 19 parts (volume fraction) of hexane solution of primary catalyst ferrocene (with 70 mg/L of ferrocene), and 4 parts (volume fraction) of hexane solution of co-catalyst methylaluminoxane (with 10 mg/L of methylaluminoxane) were added, ethyl acrylate was added, then propylene was introduced, the temperature was increased to 50° C., and the reactor pressure was controlled to be 0.4 MPa. The amount of propylene/ethyl acrylate added was adjusted to control the molar ratio of the first monomer to the second monomer to be 30:70. After reaction for 1 h, acidified ethanol was used to terminate the reaction to obtain a propylene-ethyl acrylate copolymer, and the obtained product was washed 3 times with absolute ethanol, filtered, and dried in a vacuum drying oven at 60° C. for 4 h.

Example 17

Example 17 was the same as Example 5 except for <Preparation of a polymer>.
<Preparation of a Polymer>

In a 1 L stainless-steel reactor, under the protection of nitrogen, 77 parts (volume fraction) of hexane solvent, 19 parts (volume fraction) of hexane solution of primary catalyst ferrocene (with 70 mg/L of ferrocene), and 4 parts (volume fraction) of hexane solution of co-catalyst methylaluminoxane (with 10 mg/L of methylaluminoxane) were added, ethyl acrylate was added, then propylene and ethylene were introduced, the temperature was increased to 50° C., and the reactor pressure was controlled to be 0.4 MPa. The amount of propylene/ethylene/ethyl acrylate added was adjusted to control the molar ratio of the first monomer to the second monomer to be 30:70 (a molar ratio of the ethylene monomer to ethyl acrylate). After reaction for 1 h, acidified ethanol was used to terminate the reaction to obtain a propylene-ethylene-ethyl acrylate copolymer, and the obtained product was washed 3 times with absolute ethanol, filtered, and dried in a vacuum drying oven at 60° C. for 4 h.

Example 18

Example 18 was the same as Example 5 except that the particle size of the polymer was adjusted to 5 μm in <Preparation of a polymer>, and the thickness of the first adhesive layer and the second adhesive layer was both adjusted to 10 μm in <Preparation of a separator with an adhesive layer>.

Example 19

Example 19 was the same as Example 5 except that the particle size of the polymer was adjusted to 10 μm in <Preparation of a polymer>, and the thickness of the first adhesive layer and the second adhesive layer was both adjusted to 15 μm in <Preparation of a separator with an adhesive layer>.

Example 20

Example 20 was the same as Example 5 except that the adhesive layer slurry was uniformly applied on one of the surfaces at a terminating end of the polyethylene (PE) separator substrate with a thickness of 9 μm in <Preparation of a separator with an adhesive layer>, and the surface of the first separator with the first adhesive layer was bonded to the case in <Preparation of a lithium-ion battery>.

Example 21

Example 21 was the same as Example 5 except that the second separator exceeded the terminating end of the second electrode plate, but did not exceed the terminating end of the first electrode plate, the surface of the first separator facing away from the center of the electrode assembly was bonded to the case through the first adhesive layer, and the surface of the first separator facing toward the center of the electrode assembly was bonded to the first current collector through the second adhesive layer, to form a structure shown in FIG. 8.

Comparative Example 1

Comparative Example 1 was the same as Example 1 except that no first adhesive layer was provided on the surface of the separator in <Preparation of a separator>, and <Preparation of a lithium-ion battery> in Comparative Example 1 was different from that in Example 1.
<Preparation of a Lithium-Ion Battery>

Figure 15:
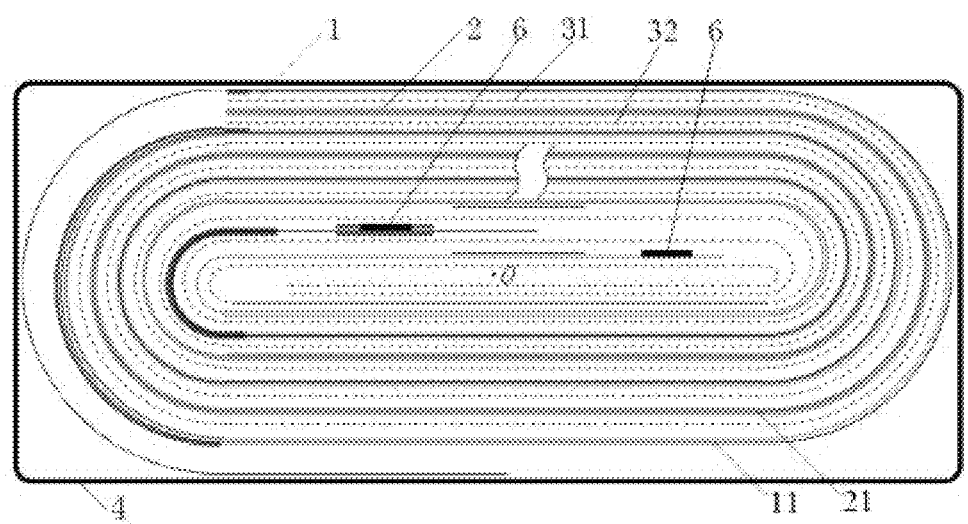
FIG. 15 is a schematic structural diagram of a lithium-ion battery according to Comparative Example 1 of this application.

The positive electrode plate, the separator, and the negative electrode plate were stacked in sequence, so that the separator was placed between the positive and negative electrode plates for separation, and winding was performed to obtain an electrode assembly, to form a structure shown in FIG. 15. The electrode assembly was placed into an aluminum-plastic packaging bag, and was dehydrated at a temperature of 80° C., and the prepared electrolyte was injected. After steps including vacuum packaging, standing, chemical conversion, and shaping, a lithium-ion battery was obtained.

Comparative Example 2

Comparative Example 2 was the same as Example 1 except that a bonding area between the first adhesive layer and the case was 5% of a contact area between the case and the electrode assembly in <Preparation of a lithium-ion battery>.

Comparative Example 3

Comparative Example 3 was the same as Example 1 except that the particle size of the polymer was adjusted to 0.5 μm in <Preparation of a polymer>.

Comparative Example 4

Comparative Example 4 was the same as Example 1 except that the particle size of the polymer was adjusted to 20 μm in <Preparation of a polymer>, and the thickness of the first adhesive layer and the second adhesive layer was both adjusted to 30 μm in <Preparation of a separator>.

The test results of Examples and Comparative Examples are shown in Table 1.

TABLE 1

| No. | Proportion of failed drop tests | Proportion of failed heavy impact tests | Energy density (Wh/L) |
|---|---|---|---|
| Example 1 | 30/200 | 27/200 | 698 |
| Example 2 | 21/200 | 18/200 | 697 |
| Example 3 | 7/200 | 4/200 | 698 |
| Example 4 | 2/200 | 1/200 | 691 |
| Example 5 | 0/200 | 0/200 | 686 |
| Example 6 | 5/200 | 3/200 | 697 |
| Example 7 | 4/200 | 1/200 | 696 |
| Example 8 | 2/200 | 0/200 | 698 |
| Example 9 | 3/200 | 1/200 | 697 |
| Example 10 | 4/200 | 2/200 | 695 |
| Example 11 | 7/200 | 3/200 | 697 |
| Example 12 | 15/200 | 18/200 | 698 |
| Example 13 | 23/200 | 20/200 | 698 |
| Example 14 | 27/200 | 31/200 | 696 |
| Example 15 | 1/200 | 0/200 | 696 |
| Example 16 | 2/200 | 1/200 | 698 |
| Example 17 | 1/200 | 0/200 | 698 |
| Example 18 | 0/200 | 0/200 | 685 |
| Example 19 | 0/200 | 0/200 | 679 |
| Example 20 | 8/200 | 4/200 | 701 |
| Example 21 | 0/200 | 0/200 | 699 |
| Comparative Example 1 | 97/200 | 69/200 | 703 |
| Comparative Example 2 | 43/200 | 34/200 | 697 |
| Comparative Example 3 | 32/200 | 29/200 | 697 |
| Comparative Example 4 | 36/200 | 32/200 | 678 |

As can be seen from Examples 1 to 21 and Comparative Example 1, results of the drop tests and the heavy impact tests of the lithium-ion battery of this application were better than those of Comparative Example 1, indicating that the lithium-ion battery with the separator of this application had significantly improved its drop resistance and heavy impact resistance, reducing a risk of battery failure under special conditions, and improving the safety of the lithium-ion battery while basically having no effect on the energy density of lithium-ion battery.

The percentage of the bonding area between the first adhesive layer and the case generally also affects the drop resistance and the heavy impact resistance of the lithium-ion battery. As can be seen from Examples 1 to 21 and Comparative Example 2, as long as the percentage of the bonding area between the first adhesive layer and the case was within the range mentioned in this application, the drop resistance and the heavy impact resistance of the lithium-ion battery could be improved, thereby improving the safety of the lithium-ion battery.

The particle size of the polymer generally also affects the bonding performance of the adhesive layer. As can be seen from Examples 1 to 21 and Comparative Examples 3 and 4, as long as the particle size of the polymer was within the range mentioned in this application, the drop resistance and the heavy impact resistance of the lithium-ion battery could be improved, thereby improving the safety of the lithium-ion battery.

As can be seen from Examples 1 to 5, with the increase of the bonding area between the first adhesive layer and the case, the drop resistance and the heavy impact resistance of the lithium-ion battery could be improved. Particularly in Example 5, the best results of the drop tests and the heavy impact tests were obtained.

The amount of the polymer contained in the adhesive layer generally also affects the bonding performance of the adhesive layer. As can be seen from Examples 6 to 8, as long as the amount of the polymer contained in the adhesive layer was within the range mentioned in this application, the drop resistance and the heavy impact resistance of the lithium-ion battery could be improved, thereby improving the safety of the lithium-ion battery.

The softening temperature and the isotacticity of the polymer generally also affect the bonding performance of the adhesive layer. As can be seen from Examples 9 to 14, as long as the amount of the polymer contained in the adhesive layer was within the range mentioned in this application, the drop resistance and the heavy impact resistance of the lithium-ion battery could be improved, thereby improving the safety of the lithium-ion battery.

The foregoing descriptions are merely preferred embodiments of this application, but are not intended to limit this application. Any modification, equivalent replacement, or improvement made without departing from the principle of this application shall fall within the protection scope of this application.

What is claimed is:

1. An electrochemical apparatus, comprising:
a case and a wound electrode assembly disposed inside the case;
wherein
the electrode assembly comprises a first electrode plate, and a second electrode plate having a polarity opposite to that of the first electrode plate;
the first electrode plate or the second electrode plate is disposed between a first separator and a second separator, the first separator or the second separator is provided between the first electrode plate and the second electrode plate, and the first electrode plate comprises a first current collector;
wherein
a first adhesive layer is provided on at least one of a surface of the first separator facing away from a center of the electrode assembly or a surface of the second separator facing away from the center of the electrode assembly;
at least one of the first separator or the second separator extends out from a terminating end of the electrode assembly and is bonded to the case through the first adhesive layer;
a bonding area between the first adhesive layer and the case is greater than or equal to 10% of a contact area between the case and the electrode assembly; and
the first adhesive layer comprises a polymer, a softening temperature of the polymer is from 130° C. to 170° C.;
wherein a second adhesive layer is further provided on at least one of a surface of the first separator facing toward the center of the electrode assembly or a surface of the second separator facing toward the center of the electrode assembly; and at least one of the first separator or the second separator extends out from a terminating end of the second electrode plate and is bonded to the first current collector through the second adhesive layer;
wherein
a bonding force between the first separator and a surface of the first current collector facing away from the center of the electrode assembly is $F_2$ and a bonding force between the first separator and the case is $F_1$, or
a bonding force between the second separator and a surface of the first current collector facing away from the center of the electrode assembly is $F_2$ and a bonding force between the second separator and the case is $F_1$;
wherein $F_2$ is greater than $F_1$.

2. The electrochemical apparatus according to claim 1, wherein the surface of the first separator facing away from the center of the electrode assembly faces a surface of the first electrode plate facing toward the center of the electrode assembly, and the surface of the first separator facing toward the center of the electrode assembly faces a surface of the second electrode plate facing away from the center of the electrode assembly.

3. The electrochemical apparatus according to claim 2, wherein the surface of the second separator facing away from the center of the electrode assembly faces a surface of the second electrode plate facing toward the center of the electrode assembly, and the surface of the second separator facing toward the center of the electrode assembly faces a surface of the first electrode plate facing away from the center of the electrode assembly.

4. The electrochemical apparatus according to claim 1, wherein
the bonding force $F_1$ between the first separator and the case is from 5 N/m to 55 N/m in a bonding zone between the first separator and the case; or
the bonding force $F_1$ between the second separator and the case is from 5 N/m to 55 N/m in a bonding zone between the second separator and the case.

5. The electrochemical apparatus according to claim 1, wherein
the bonding force $F_2$ between the first separator and the first current collector is from 5.01 N/m to 60 N/m; or
the bonding force $F_2$ between the second separator and the first current collector is from 5.01 N/m to 60 N/m.

6. The electrochemical apparatus according to claim 1, wherein a difference $F_2-F_1$ is in a range of 1 N/m to 15 N/m.

7. The electrochemical apparatus according to claim 1, wherein
along a winding direction of the electrode assembly, a bonding area between a portion of the first separator exceeding a terminating end of the second electrode plate and a surface of the first current collector facing away from the center of the electrode assembly is $S_1$, and a bonding area between the portion of the first separator exceeding the terminating end of the second electrode plate and the case is $S_2$, $S_1$ is greater than $S_2$; or
a bonding area between a portion of the second separator exceeding a terminating end of the second electrode plate and a surface of the first current collector facing away from the center of the electrode assembly is $S_1$, and a bonding area between the portion of the second separator exceeding a terminating end of the first electrode plate and the case is $S_2$, $S_1$ is greater than $S_2$.

8. The electrochemical apparatus according to claim 1, wherein along a winding direction of the electrode assembly, the first separator extends out from the terminating end of the electrode assembly, and the second separator exceeds a terminating end of the second electrode plate but does not exceed a terminating end of the first electrode plate.

9. The electrochemical apparatus according to claim 1, wherein monomers forming the polymer comprise a first monomer and a second monomer, wherein the first monomer is propylene, and the second monomer comprises at least one of ethylene, vinylidene fluoride, vinyl chloride, butadiene, isoprene, styrene, acrylonitrile, ethylene oxide, propylene oxide, acrylate, vinyl acetate, or caprolactone.

10. The electrochemical apparatus according to claim 9, wherein the first monomer accounts for 30 mol % to 95 mol % with respect to a total amount of monomers forming the polymer, and the second monomer accounts for 5 mol % to 70 mol % with respect to the total amount of monomers forming the polymer.

11. The electrochemical apparatus according to claim 1, wherein the second adhesive layer comprises the polymer.

12. The electrochemical apparatus according to claim 11, wherein monomers forming the polymer comprise a first monomer and a second monomer, wherein the first monomer is propylene, and the second monomer comprises at least one of ethylene, vinylidene fluoride, vinyl chloride, butadiene, isoprene, styrene, acrylonitrile, ethylene oxide, propylene oxide, acrylate, vinyl acetate, or caprolactone.

13. The electrochemical apparatus according to claim 11, wherein the polymer is made of particles, and an average particle size of the particles is from 1 μm to 10 μm.

14. The electrochemical apparatus according to claim 11, wherein the polymer satisfies at least one of the following characteristics:
(a) isotacticity of the polymer is from 45% to 80%; or
(b) a weight-average molecular weight of the polymer is from 5000 g/mol to 1000000 g/mol.

15. The electrochemical apparatus according to claim 1, wherein the polymer is made of particles, and an average particle size of the particles is from 1 μm to 10 μm.

16. The electrochemical apparatus according to claim 1, wherein the first adhesive layer has a thickness of 1 μm to 50 μm.

17. The electrochemical apparatus according to claim 1, wherein the polymer satisfies at least one of the following characteristics:
(a) isotacticity of the polymer is from 45% to 80%; or
(b) a weight-average molecular weight of the polymer is from 5000 g/mol to 1000000 g/mol.

18. The electrochemical apparatus according to claim 1, wherein the bonding area between the first adhesive layer and the case is from 10% to 50% of the contact area between the case and the electrode assembly.

19. An electronic apparatus, comprising an electrochemical apparatus, the electrochemical apparatus comprising:
a case and a wound electrode assembly disposed inside the case; wherein
the electrode assembly comprises a first electrode plate, and a second electrode plate having a polarity opposite to that of the first electrode plate;
the first electrode plate or the second electrode plate is disposed between a first separator and a second separator, the first separator or the second separator is provided between the first electrode plate and the second electrode plate, and the first electrode plate comprises a first current collector; wherein
a first adhesive layer is provided on at least one of a surface of the first separator facing away from a center of the electrode assembly or a surface of the second separator facing away from the center of the electrode assembly;
at least one of the first separator or the second separator extends out from a terminating end of the electrode assembly and is bonded to the case through the first adhesive layer; and
a bonding area between the first adhesive layer and the case is greater than or equal to 10% of a contact area between the case and the electrode assembly; and
the first adhesive layer comprises a polymer, a softening temperature of the polymer is from 130° C. to 170° C.;
wherein a second adhesive layer is further provided on at least one of a surface of the first separator facing toward the center of the electrode assembly or a surface of the second separator facing toward the center of the electrode assembly; and at least one of the first separator or the second separator extends out from a terminating end of the second electrode plate and is bonded to the first current collector through the second adhesive layer;

wherein a bonding force between the first separator and a surface of the first current collector facing away from the center of the electrode assembly is $F_2$ and a bonding force between the first separator and the case is $F_1$, or a bonding force between the second separator and a surface of the first current collector facing away from the center of the electrode assembly is $F_2$ and a bonding force between the second separator and the case is $F_1$;

wherein $F_2$ is greater than $F_1$.

* * * * *